United States Patent [19]
Dye et al.

[11] Patent Number: 5,350,980
[45] Date of Patent: Sep. 27, 1994

[54] NONLINEAR INDUCTOR WITH MAGNETIC FIELD REDUCTION

[75] Inventors: Malcom Dye, Southampton; Terence K. Gibbs, Portsmouth; Ian D. Mercer, Southampton; Graham Luck, Chichester, all of United Kingdom

[73] Assignee: International Business Machines Corporation, Armonk, N.Y.

[21] Appl. No.: 938,977

[22] Filed: Sep. 1, 1992

[30] Foreign Application Priority Data

Sep. 2, 1991 [GB] United Kingdom ............... 09118739

[51] Int. Cl.⁵ .................. G09G 1/04; H01J 29/06; H01F 21/00
[52] U.S. Cl. ............................... 315/370; 315/8; 315/399; 336/110
[58] Field of Search ............ 315/370, 399, 400, 8; 336/110, 30, 87, 110; 335/210, 214, 304, 306, 302

[56] References Cited

U.S. PATENT DOCUMENTS

| | | | |
|---|---|---|---|
| 3,153,174 | 10/1964 | Claypool et al. | 315/370 |
| 3,434,001 | 3/1969 | Okuda | 315/400 |
| 4,257,026 | 3/1981 | Zelazo et al. | 336/110 |
| 4,331,907 | 5/1982 | Laux | 315/400 |
| 4,634,930 | 1/1987 | Toshiyasu et al. | 315/8 |

FOREIGN PATENT DOCUMENTS 2157087A 10/1985 United Kingdom .

*Primary Examiner*—Gregory C. Issing
*Attorney, Agent, or Firm*—Mark S. Walker

[57] ABSTRACT

A nonlinear inductor for a CRT line timebase circuit comprises a bobbin carrying an inductive coil 41 and a first permanent magnet adjacent the coil. A second permanent magnet is positioned and oriented relative to the first magnet in such a manner that the magnetic field generated by the nonlinear inductor is substantially reduced. Because the second magnet is integral, the nonlinear inductor occupies the same printed circuit board area as a conventional nonlinear inductor. Furthermore, because the second magnet is oriented to substantially cancel the magnetic field, no additional magnets are required for deflecting the magnet field away from the CRT.

5 Claims, 5 Drawing Sheets

NONLINEAR INDUCTOR WITH MAGNETIC FIELD REDUCTION

BACKGROUND OF THE INVENTION

1. Field of the Invention

The present invention generally relates to a nonlinear inductor with magnetic field reduction for use in a raster-scanned CRT display such as a television receiver or a computer visual display unit.

2. Description of the Related Art

A raster-scanned CRT display comprises a line timebase circuit for generating a sawtooth deflection current in a pair of electromagnetic line scan coils. The deflection current energizes the coils to produce a time-variant magnetic deflection field. The deflection field scans one or more electron beams from one side of the CRT screen to the other side during a line scan period and rapidly returns the electron beam during a retrace or flyback period to the start of the next line of the raster to be scanned. The line timebase circuit typically comprises an inductor connected in series with a high-voltage solid-state switch such as a bipolar transistor. During the line scan period, the switch is closed and current flows through the inductor and switch from a high voltage DC supply (typically 100 V) to ground. The current flowing through the inductor and the current flowing in the scan coils increase at a rate proportional to the voltage across the inductor. During the flyback period, the switch is opened. The current in the inductor rapidly reverses and a back Electromotive Force (EMF) or "flyback pulse" is generated across the inductor by the collapsing magnetic field in the inductor. The flyback pulse is controlled by a tuning capacitor connected across the switch. The back EMF dissipates causing the current in the scan coils to rapidly reverse. The electron beam is thus deflected rapidly back to the start of the next scan line.

Ideally, the deflection coils would be pure inductances. In practice however, the coils have a DC resistance. The resistance causes an asymmetric nonlinearity in the sawtooth deflection current. The nonlinearity gives rise to objectionable asymmetric distortion of an image displayed on the CRT screen. The asymmetric distortion is a function of the inductance-to-resistance ratio of the deflection coils and therefore varies proportionally with frequency.

In a typical CRT display, the asymmetric nonlinearity is corrected by connecting a nonlinear inductor in series with the deflection coils. The nonlinear inductor typically comprises a permanent magnet positioned adjacent an inductive winding. The inductance of the nonlinear inductor varies about an operating point as a function of the current flowing through the winding. Some nonlinear inductors comprise a movable magnet which can be set in position during a manufacturing process step. The movable magnet permits manual adjustment of the polarity of the magnet relative to the winding, and therefore changes the operating point of the inductor.

In a color CRT display, low-level magnetic correction fields are arranged around the neck of the CRT to optimize electron beam convergence and color purity. The magnetic field from the magnet can interfere with these correction fields and thus degrade picture quality. To minimize such degradation, the not, linear inductor Is usually located as far away from the CRT as possible. However, because CRT displays are becoming smaller in size, and CRT resolution is increasing, it is becoming increasingly difficult to prevent the stray field from the non linear inductor from interfering with the correction fields.

Such interference may be prevented by magnetically screening the nonlinear inductor from the CRT. However, this is both costly and space consuming. Alternatively, as described later with reference to FIG. 7 of the accompanying drawings, another magnet may be located in the vicinity of the nonlinear inductor to deflect the magnetic field from the nonlinear inductor away from the CRT. However, the deflection provided by the other magnet is very sensitive to its position relative to the CRT and the nonlinear inductor. Therefore, printed circuit board space must be set aside for accommodating the other magnet.

SUMMARY OF THE INVENTION

In accordance with tile present invention, there is now provided a nonlinear inductor comprising: a bobbin carrying an inductive coil; a first permanent magnet adjacent the coil; and a second permanent magnet positioned and oriented relative to the first magnet in such a manner that the magnetic field generated by the nonlinear inductor is substantially reduced.

Because the second magnet is oriented to substantially cancel the magnetic field, no additional magnets are required for deflecting the magnet field away from the CRT.

Viewing the present invention from a second aspect, there is provided a nonlinear inductor comprising: a bobbin carrying an inductive coil; a first permanent magnet adjacent the coil; and a second permanent magnet positioned and oriented relative to the first magnet in such a manner that the magnetic field generated by the first magnet is opposed to the magnetic field generated by the second magnet.

Because the second magnet is integral, a nonlinear inductor of the present invention occupies the same printed circuit board area as a conventional nonlinear inductor.

BRIEF DESCRIPTION OF THE DRAWINGS

A preferred embodiment of the present invention will now be described, by way of example only, with reference to the accompanying drawings in which.

Description of the Preferred Embodiment

Figure 1:
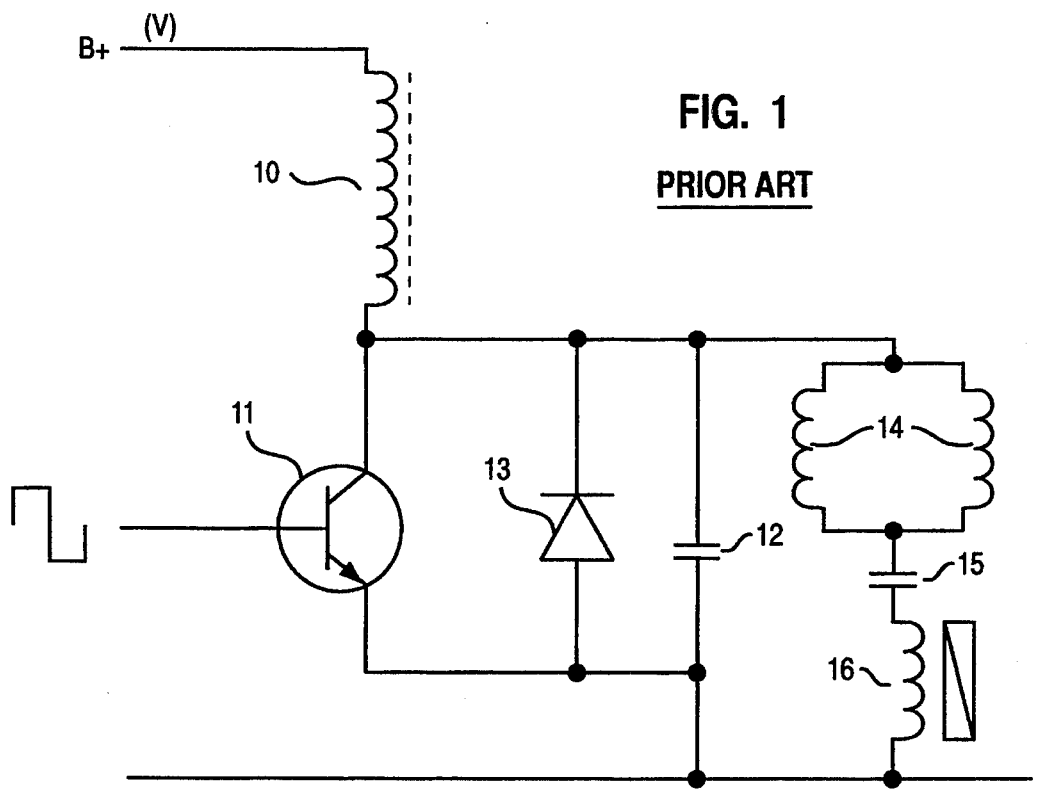
FIG. 1 is a circuit diagram of a line timebase circuit for a CRT display of the prior art.

FIG. 1 shows an example of line timebase or "flyback" circuit comprising an inductor 10 connected between a high voltage (100 V) supply rail V and the collector of a bipolar transistor switch 11. The emitter of transistor 11 is connected to ground. A capacitor 12 is connected between the collector of transistor 11 and ground and a diode 13 is connected across capacitor 12 for conducting current from ground to the collector of transistor 11. A pair of line deflection coils 14 are also connected to the collector of transistor 11. The inductance of coils 14 is much smaller than that of inductor 10. An S correction capacitor 15 is connected between coils 14 and a nonlinear inductor 16. Capacitor 15 compensates for a symmetrical linearity error produced by a geometrical relationship between deflection angle and electron beam displacement on a CRT screen. The capacitance of capacitor 15 is much larger than that of capacitor 12. Nonlinear inductor 16 is connected between capacitor 15 and ground.

Figure 2:
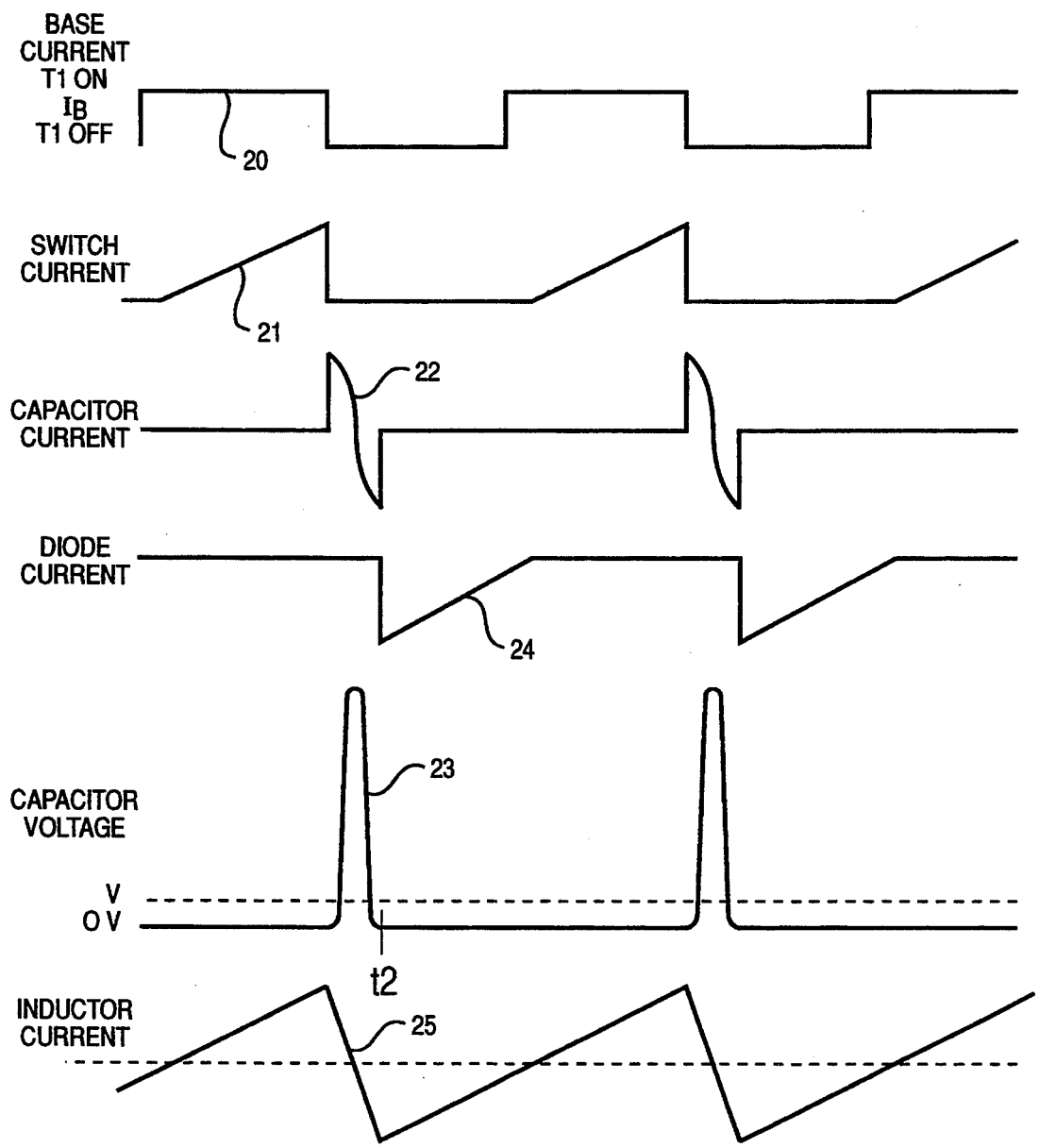
FIG. 2 is a waveform diagram corresponding to the line timebase circuit shown in FIG. 1.

Referring now to FIG. 2, in operation transistor 11 is turned on and off with a 50% duty cycle by an alternating square wave base current 20. When transistor 11 is turned on, current 21 flows from the supply rail through inductor 10 to ground through transistor 11. The current increases at a rate proportional to the voltage V across inductor 10. When transistor 11 is turned off, current 22 flows through inductor 10 and into capacitor 12. Voltage 23 across capacitor 12 rises as capacitor 12 charges up thus reversing the voltage across inductor 10. The current in inductor 10 thus falls at a faster rate. Diode 13 prevents the voltage across capacitor 12 from going negative at t2 to prevent the voltage across capacitor 12 from oscillating. Current 24 now flows from ground through inductor 10 to the supply rail through diode 13 rather than out of capacitor 12. Therefore, over a full cycle, inductor 10 carries a sawtooth current 25. A current similar to sawtooth current 25 is therefore drawn through coils 14.

Coils 14 are AC coupled to ground by capacitor 15 to remove any DC offset from the current in coils 14. Furthermore, the deflection current generates a parabolic voltage across capacitor 15 which is the integral of the deflection current. The parabolic voltage in turn modulates the deflection current in coils 14 to provide cancellation of the symmetrical linearity error.

Figure 3A:
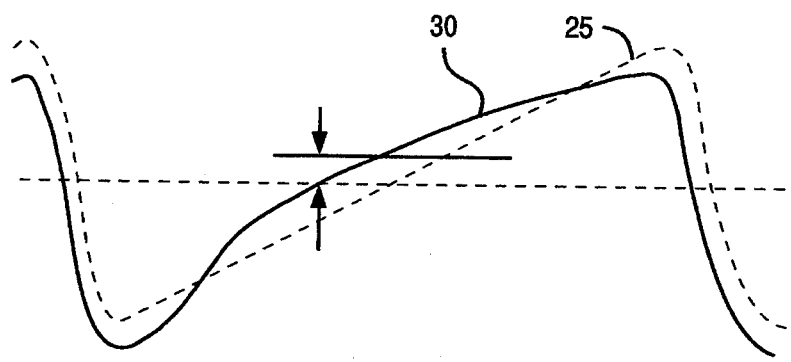
FIG. 3(a) is a waveform diagram illustrating a nonlinear deflection current.
Figure 3B:
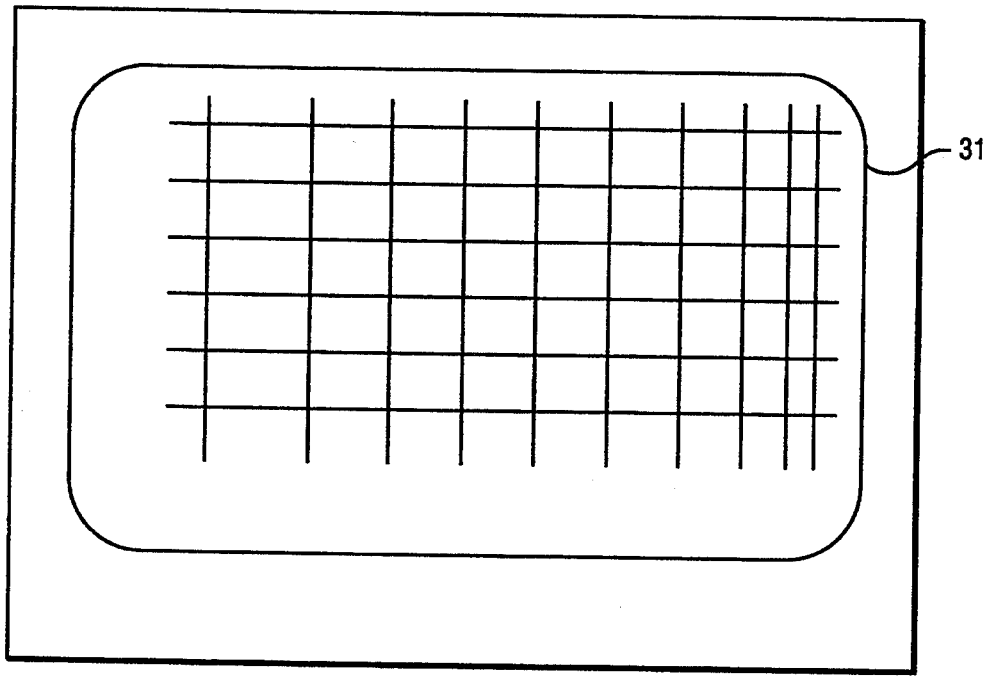
FIG. 3(b) is a corresponding image geometry distortion.

Referring now to FIG. 3, the ideal deflection current with no S correction or linearity correction applied is a symmetrical, linear sawtooth current 25. However, in practice, the deflection current is an asymmetrical, nonlinear sawtooth current 30. Asymmetrical nonlinearities are produced in the deflection current by frequency dependent energy losses from complex parasitic impedances within the circuit. The asymmetrical deflection current 30 causes an offset, nonlinear line deflection of the electron beam. This produces a distorted image illustrated by crosshatch 31.

Figure 4:
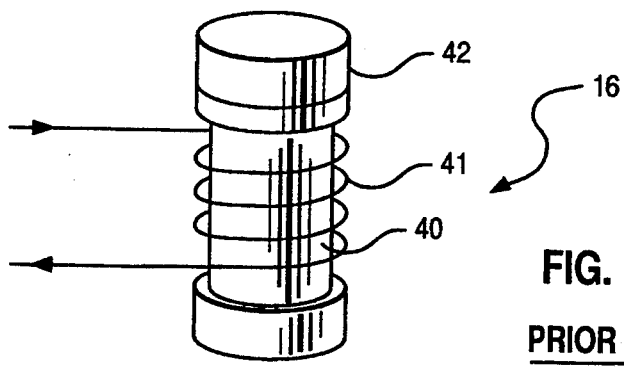
FIG. 4 is an isometric view of a nonlinear inductor of the prior art.
Figure 5:
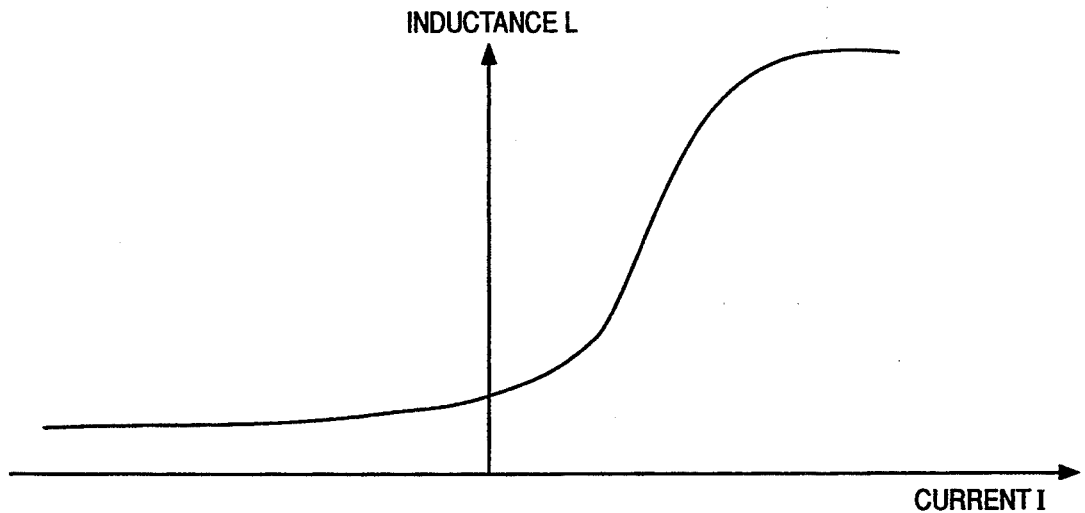
FIG. 5 is a graph illustrating the inductance of the nonlinear inductor varying as a function of current flowing through the nonlinear inductor.

With reference to FIG. 4, an example of nonlinear inductor 16 comprises a dumbbell-shaped ferrite core 40 carrying an inductive coil 41. A permanent magnet 42 is bonded to the core 40. Magnet 42 causes the inductance L of inductor 16 to vary as a nonlinear function of the current I flowing in coil 41. FIG. 5 illustrates graphically the nonlinear function of inductor 16.

Figure 6:
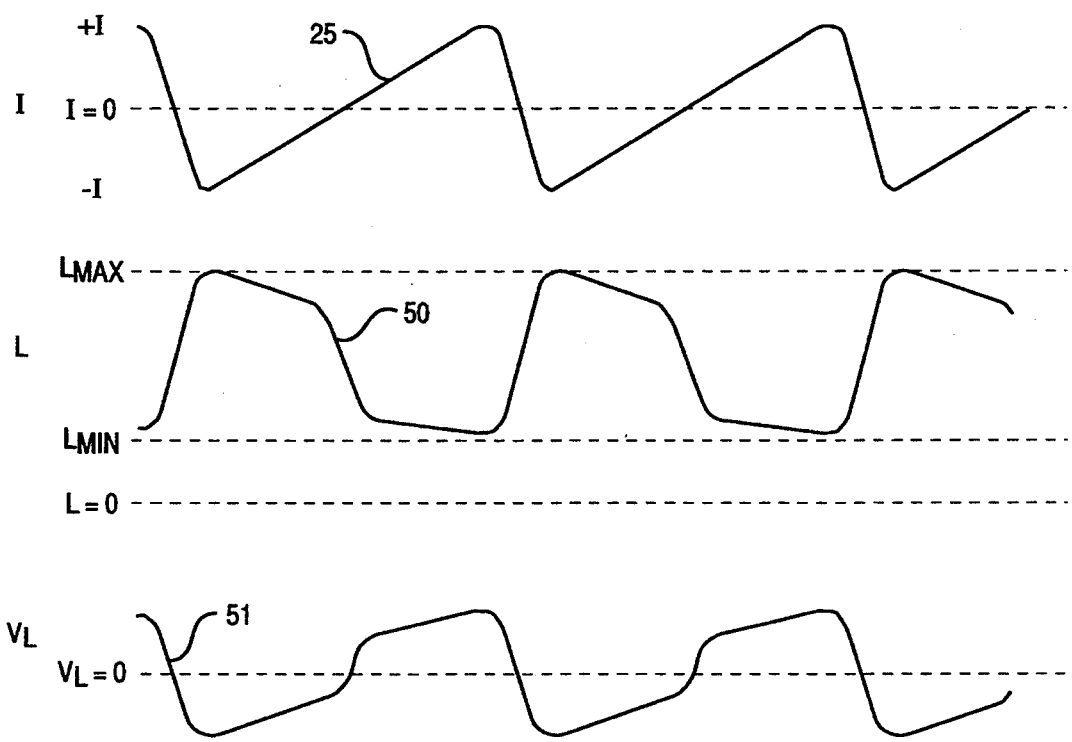
FIG. 6 is a waveform diagram illustrating the inductance of the nonlinear inductor varying as a function of a sawtooth deflection current flowing through the nonlinear inductor.

Referring now to FIG. 6, waveform 50 illustrates the variation of the inductance L between maximum and minimum limits Lmax and Lmin in response to a sawtooth current I 25 flowing in coil 41. Thus, the impedance of inductor 16 at a particular frequency also varies between maximum and minimum values. A voltage signal 51 is therefore dropped across the inductor.

Referring back to FIG. 1, coils 14 and inductor 16 form a potential divider. In operation, the sawtooth deflection current flowing through coils 14 generates voltage signal 51 across inductor 16. Voltage signal 51 amplitude-modulates capacitor voltage 23 in such a way as to cancel the effects of the parasitic impedances on the deflection current.

Figure 7:
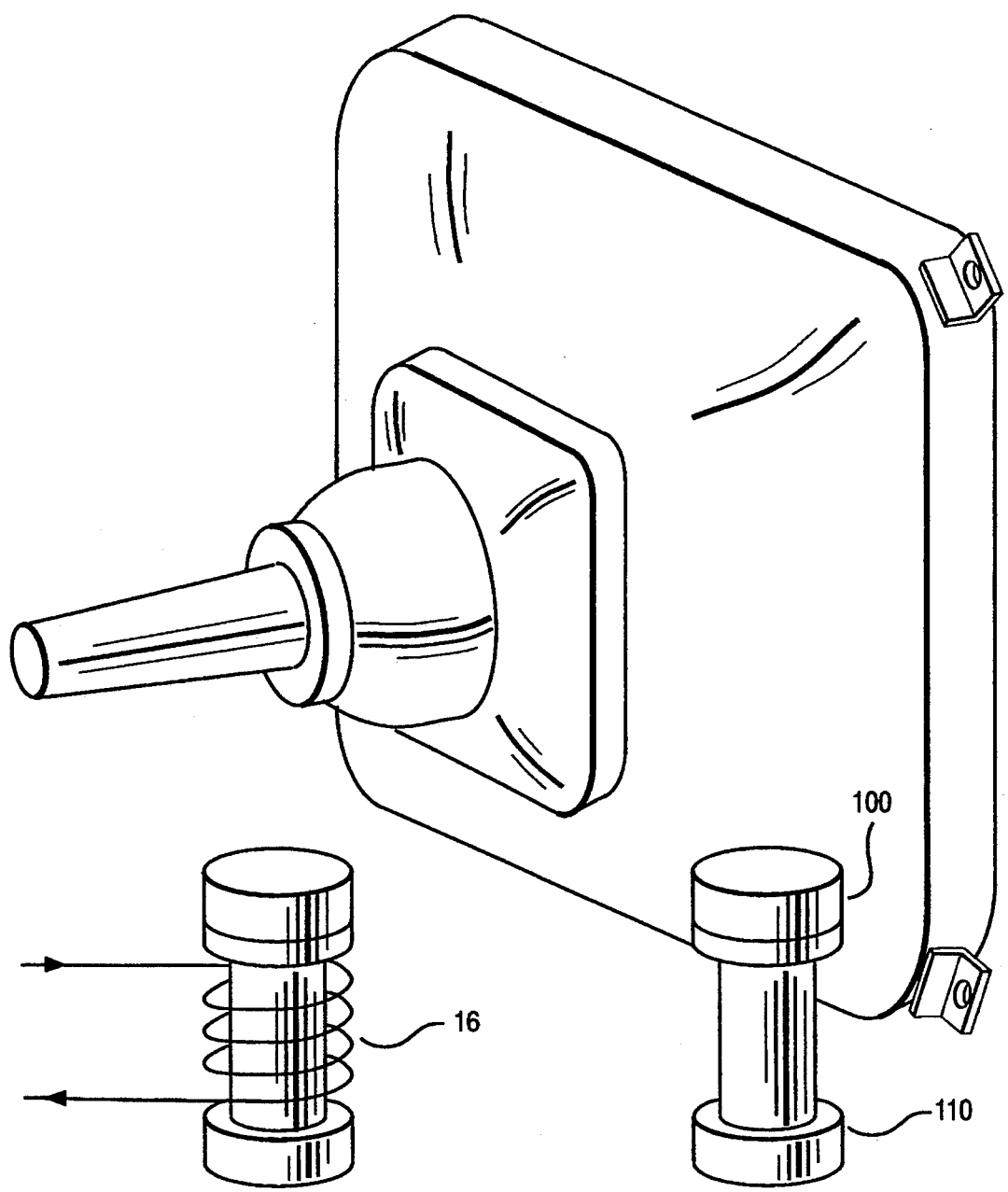
FIG. 7 is an isometric view of conventional apparatus for deflecting the magnetic field generated by the nonlinear inductor shown in FIG. 4 away from a CRT.

Referring now to FIG. 7, as hereinbefore mentioned, the magnetic field from the nonlinear inductor 16 may be deflected away from the CRT by placing another magnet 100 on a ferrite core 110 in the vicinity of the nonlinear inductor. It will however be appreciated from FIG. 7 that the deflection provided by the other magnet is very sensitive to its position relative to the CRT and the nonlinear inductor. It will also be appreciated that printed circuit board space must be set aside for accommodating the other magnet.

Figure 8:
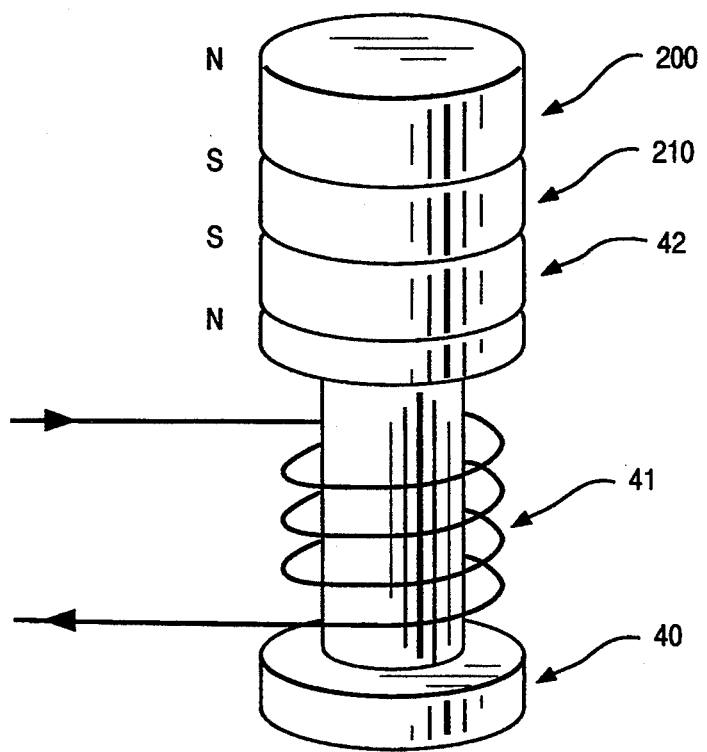
FIG. 8 is an isometric view of a nonlinear inductor of the present invention.

Referring now to FIG. 8, an example of a nonlinear inductor of the present invention comprises a dumbbell-shaped ferrite core or bobbin 40 carrying an inductive coil 41. A first permanent magnet 42 is bonded to one end of the bobbin 40. Magnet 42 causes the inductance L of inductor 16 to vary as a nonlinear function of the current I flowing in coil 41. A second permanent magnet 200 is located above the first magnet 42 in such a manner that one pole of the second magnet 200 faces a like pole of the first magnet 42. The second magnet 200 is spaced from the first magnet 42 by an insulator 210 of invariant thickness. The magnetic characteristics of the first and second magnets 42 and 200 are substantially identical, and the thickness of the insulator 210 is determined so that the magnetic field generated by the nonlinear inductor in use is substantially cancelled by the second magnet. It will however be appreciated that, in other embodiments of the present invention, the magnetic strength of tile second magnet may be less than the magnetic strength of the first meg:let but sufficient to reduce the magnetic field from the nonlinear inductor to an acceptable level.

What is claimed is:

1. A nonlinear inductor comprising:
   a bobbin carrying an inductive coil;
   a first permanent magnet adjacent to and coaxial with the coil; and
   a second permanent magnet fixedly positioned to the coaxial with the first magnet and oriented relative to the first magnet in such a manner that the magnetic field generated by the nonlinear inductor is effectively cancelled by the magnetic field of said second permanent magnet.

2. A nonlinear inductor comprising:
   a bobbin carrying an inductive coil;
   a first permanent magnet adjacent to and coaxial with the coil; and
   a second permanent magnet fixedly positioned to be coaxial with the first magnet and oriented relative to the first magnet in such a manner that the magnetic field generated by the first magnet is opposed to the magnetic field generated by the second magnet.

3. The nonlinear inductor of claim 1 further comprising an insulator mounted between said first and said second permanent magnets.

4. The nonlinear inductor of claim 1 wherein said first and second permanent magnets are magnetized axially and wherein said second permanent magnet is oriented so that like poles of said first and second permanent magnets are adjacent.

5. A line timebase circuit for a cathode ray tube device comprising:
   a pair of line deflection coils;
   a nonlinear inductor connected in series with said deflection coils, said nonlinear inductor having a coil, a first permanent magnet mounted coaxially with and adjacent said coil causing a nonlinear inductance characteristic in said coil, and a second permanent magnet mounted coaxially with and adjacent said first permanent magnet such that it cancels the magnetic field of said nonlinear inductor without changing the nonlinear inductance characteristic.

* * * * *